Dec. 16, 1969 A. W. T. MOTTRAM 3,484,859
GENERATING DUCT FOR A MAGNETOHYDRODYNAMIC ELECTRICAL GENERATOR
Filed Nov. 1, 1967 3 Sheets-Sheet 1

FIG.I.

INVENTOR
ANTHONY WILLIAM THOMAS MOTTRAM.

Dec. 16, 1969  A. W. T. MOTTRAM  3,484,859
GENERATING DUCT FOR A MAGNETOHYDRODYNAMIC ELECTRICAL GENERATOR
Filed Nov. 1, 1967  3 Sheets-Sheet 2

INVENTOR
ANTHONY WILLIAM THOMAS MOTTRAM

United States Patent Office 3,484,859
Patented Dec. 16, 1969

3,484,859
**GENERATING DUCT FOR A MAGNETOHYDRO-
DYNAMIC ELECTRICAL GENERATOR**
Anthony William Thomas Mottram, Princethorpe, England, assignor to Rolls Royce Limited, Derby, England, a British company, and Central Electricity Generating Board, London, England, a British body corporate
Filed Nov. 1, 1967, Ser. No. 679,681
Claims priority, application Great Britain, Nov. 2, 1966, 49,025/66
Int. Cl. H02k 45/00
U.S. Cl. 310—11                    8 Claims

ABSTRACT OF THE DISCLOSURE

A generating duct for a magnetohydrodynamic electrical generator. The duct is constructed from a plurality of annular members assembled end-to-end with a layer of insulation interposed between each pair of adjacent members, each annular member comprising a pair of electrodes defining opposite sides of the annular member and positioned substantially parallel with lines of force of a magnetic field, which in operation of the generator extends substantially perpendicularly to the longitudinal axis of the duct, and a pair of connectors defining the remaining sides of the annular member and each interconnecting adjacent ends of the electrodes. The connectors of at least some of the annular members are connected electrically by conductors extending to one end only of the duct and leading to an electrical load externally of the duct, the conductors being mechanically supported by the duct and so arranged that the resultant of the electro-magnetic forces perpendicular to the longitudinal axis of the duct and to the electrodes and acting on the connectors, the conductors and the gas flowing through the duct is substantially zero.

---

The invention relates to a generating duct for a magnetohydrodynamic electrical generator (referred to hereinafter as a MHD generator) in which a stream of hot electrically-conductive gas is passed through a duct. A magnetic field extends transversely of the axis of the duct and electric currents are induced thereby in the gas and are collected by suitably arranged electrodes.

The invention is particularly concerned with a MHD generating duct of the kind (hereinafter called the kind described) constructed from a plurality of annular members assembled end-to-end and annular layers of insulation interposed one between each pair of adjacent members, each annular member comprising a pair of electrodes defining opposite sides of the annular member and positioned substantially parallel with lines of force of a magnetic field, which in operation of the generator extends substantially perpendicularly to the longitudinal axis of the duct, and a pair of connectors defining the remaining sides of the annular member and each interconnecting adjacent ends of the electrodes.

Our co-pending application Ser. 652,975, filed July 12, 1967 is concerned with a MHD generating duct of the kind described in which the electrodes are substantially straight and parallel to the lines of magnetic force in the magnetic field. Currents flowing in the electrodes, therefore, do not produce electro-magnetic forces in the electrodes. The connectors however intersect the lines of magnetic force and currents flowing in them produce electro-magnetic forces on the connectors in a direction mutually perpendicular to the connectors and to the lines of magnetic force.

In the generating duct described in the aforesaid application, the annular members are arranged with the connectors oblique to the longitudinal axis of the duct and as a result, the electro-magnetic forces on the connectors are also oblique to the longitudinal axis and may be resolved into longitudinal components which act parallel with the longitudinal axis of the duct and transverse components which act perpendicularly to the longitudinal axis of the duct. The longitudinal components of the electro-magnetic forces are balanced by the forces, acting on the walls of the duct, due to the pressure of the gas flowing therethrough, except for an unbalanced force due to the axial momentum of the gas as it emerges from the downstream end of the duct. The currents flowing through the connectors of at least some of the annular members are conducted to an external load. Therefore conductors connected to or forming continuations of the connectors and leading to the external load will, where they intersect the magnetic field, also be subjected to electro-magnetic forces having at least a component acting perpendicularly to the longitudinal axis of the duct. The present invention is concerned with the problem of accommodating the aforesaid transverse components of the forces acting on the connectors and the conductors.

According to the invention, in a MHD generating duct of the kind described, the connectors of at least some of the annular members are connected electrically by conductors extending towards one end only of the duct and leading to an electrical load externally of the duct, the conductors being mechanically supported by the duct and so arranged that the resultant of the electro-magnetic forces perpendicular to the longitudinal axis of the duct and acting on the connectors, the conductors and the gas flowing through the duct is substantially zero.

Conveniently, the conductors extend substantially parallel to the longitudinal axis of the duct and where the duct is of rectangular cross-section, substantially half the conductors may be supported by one wall of the duct and the remainder by the opposite wall of the duct. The walls of the duct supporting the conductors may carry longitudinal troughs in which the conductors are located and to which they are secured. The conductors may be embedded in each trough in a mass of elastomeric material capable of transmitting the electromagnetic forces acting on the conductors to the trough and hence to the duct and also serving to damp vibration of the conductors. The conductors conveniently extend along the troughs towards the upstream end of the duct. The conductors, the connectors and the electrodes may be tubes through which a coolant fluid can be passed.

By way of example, a generating duct for a MHD generator will now be described with reference to the accompanying drawings, in which.

Figure 5:
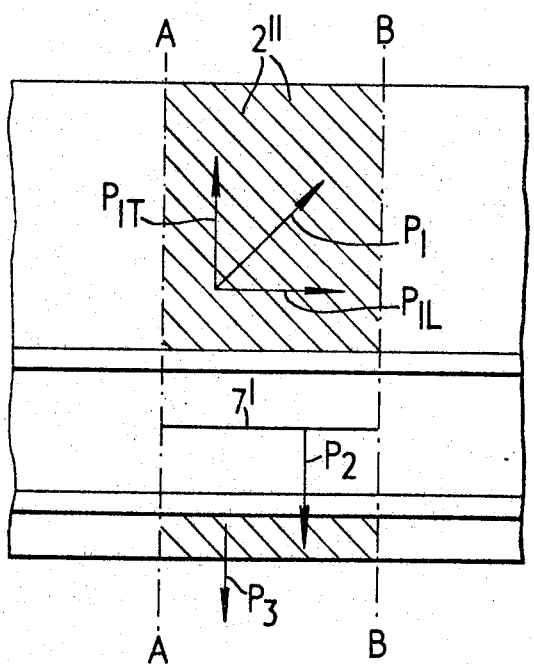
Figure 3:
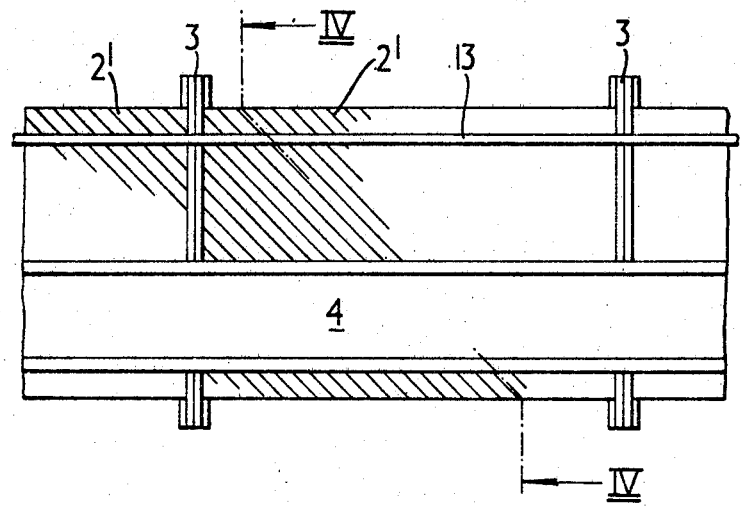
FIGURE 3 is a diagrammatic plan view of a part of the duct shown in FIGURE 1.
Figure 4:
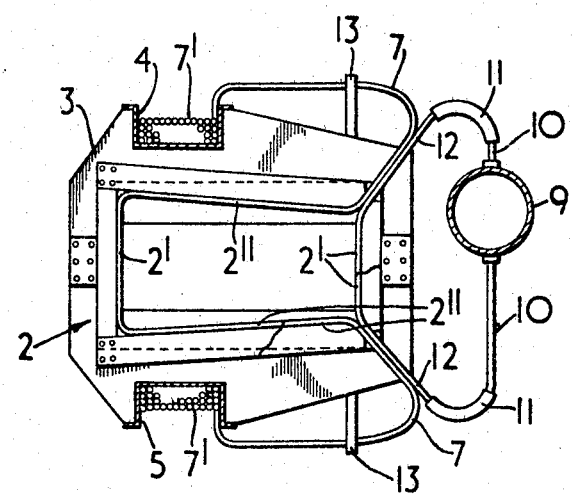

FIGURE 4 is a section through the duct on the line IV—IV in FIGURE 3 viewed throughout in the direction of the arrows IV, a corner portion of an annular member having been removed to reveal the adjacent annular member in the upstream direction of the duct, and FIGURE 5 is a diagrammatic plan view of a part of the duct drawn to a larger scale than in FIGURE 3 and illustrating forces acting on the annular members and the conductors connected thereto.

Figure 1:
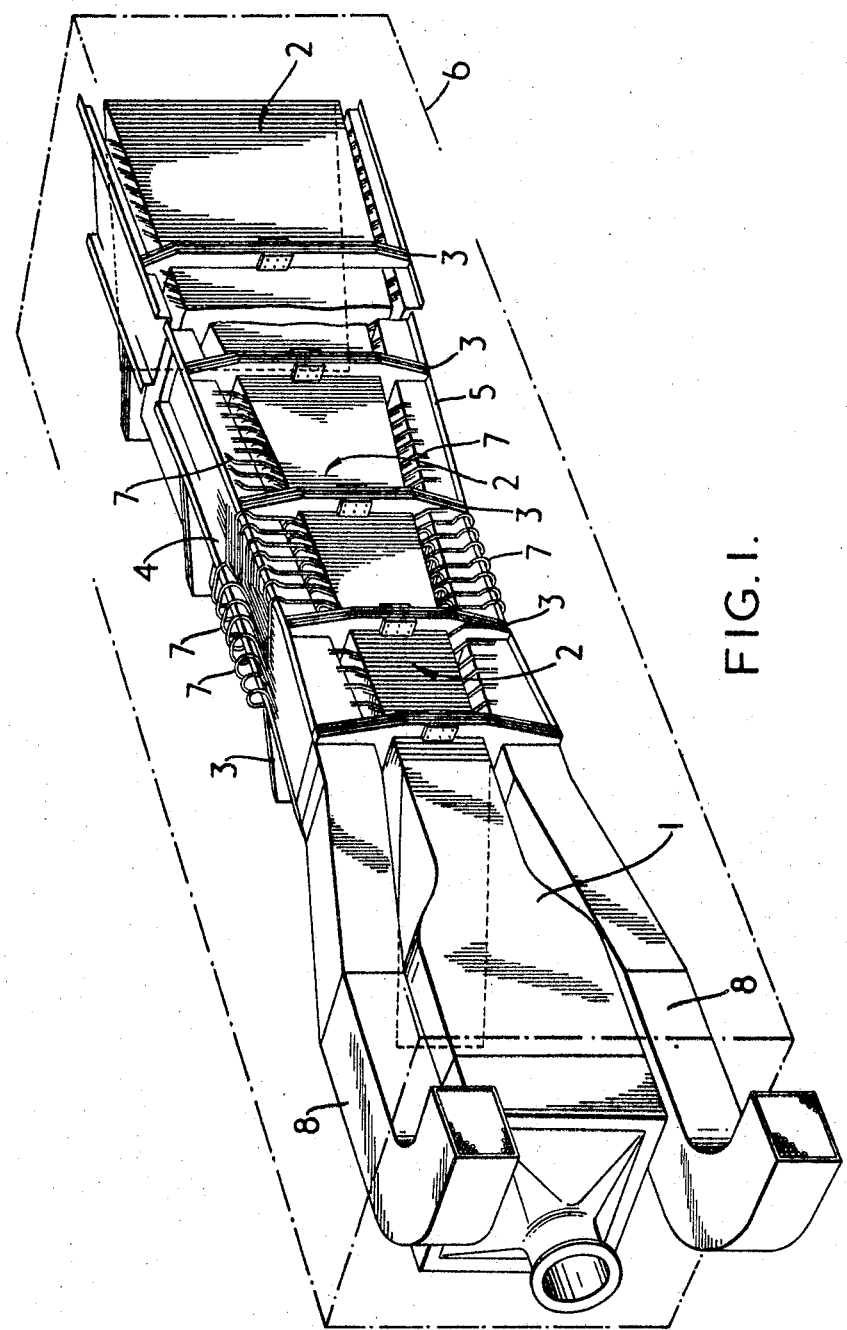
FIGURE 1 is a diagrammatic perspective view of the generator including said duct.
Figure 2:
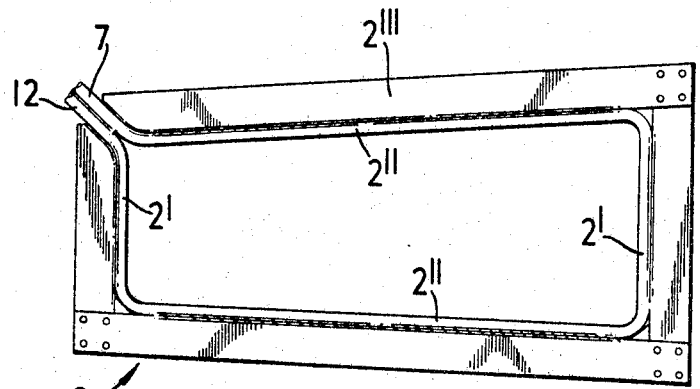
FIGURE 2 is a front elevation, viewed from the upstream end thereof, of an annular member from which the duct shown in FIGURE 1 is constructed.

Referring to FIGURE 1 particularly, the generator comprises a combined combustion chamber and convergent accelerating nozzle 1 leading to the duct which is divergent and is formed from a plurality of annular members 2 (as shown in FIGURE 2) each of trapezium configuration having two sides parallel and each defining an electrode 2' and the remaining two sides defining the aforesaid connectors 2". The annular members 2 are arranged end-to-end in abutment with interposed layers of insulation (not shown) provided between each pair of adjacent members. The annular members 2, which are formed from pressed tube, carried by an annular template 2''' (see FIGURE 2) in a manner described in the aforesaid co-pending application, are disposed at 45° to the longitudinal axis of the duct, as viewed in plan and shown in FIGURE 3, and are sealingly connected together to form the duct. At intervals along its length the duct is provided with collars 3, which support, adjacent the top and bottom walls of the duct, longitudinally extending troughs 4 and 5. The nozzle portion 1, the annular members 2, the layers of insulation, the collars 3 and the troughs 4 and 5 together form a rigid structure which is axially slidable within a tubular magnet assembly of which the inner wall is indicated at 6. The magnet produces a magnetic field extending perpendicularly to the longitudinal axis of the duct and parallel with the electrodes 2'.

Each annular member 2 has adjacent one corner thereof (as described in the aforesaid application) a conductor 7 which carries current from the electrodes 2', and the connectors 2" to an external load. The conductors 7 of the annular members are bent to enter one or other of the troughs 4 and 5 and each has a portion 7' extending longitudinally in the trough to one end of the duct, e.g., the upstream end, where the troughs form tubular casings 8 in which the conductors are led to the external load. This construction enables the combustion chamber 1 and the duct to be withdrawn as a unit from the magnet 6. The portions 7' of the conductors 7 are packed in layers in the troughs and are embedded therein in a mass of elastomeric material, such as flexible resin or silicone rubber in the appropriate trough 4 or 5. This serves the dual purpose of supporting the conductors and also damping vibration thereof. The conductors 7 and the electrodes 2' and connectors 2" of the annular members 2 are tubular. A liquid coolant is circulated therethrough, a pair of header conduits being provided for this purpose.

Referring to FIGURE 4, one of the header conduits 9 is connected by a pipe 10 and an insulating tubular connection 11 to a tube 12 integral with an electrode 2' and formed alongside the portion of the conductor 7 extending from the annular member 2. The other header conduit, not shown, is connected to the portions of the conductors 7 extending from the end of a tubular casing 8 remote from the trough 4 or 5. The portion of each conductor 7 between an annular member 2 and the trough 4 or 5 is supported on a bracket 13 carried on the collars 3 and extending between them. The conductors 7 communicate with the corners of adjacent annular members 2 in cyclic order around the longitudinal axis of the duct. Thus the conductor 7 and the adjacent tube 12 of an annular member 2 extend from the upper right-hand corner of the member, as shown in FIGURE 4. The conductor 7 and the tube 12 of the next annular member 2 in the upstream direction of the duct extend from the lower right-hand corner of the member, also as shown in FIGURE 4. The conductor 7 and the tube 12 of the next two annular members 2 in the upstream direction of the duct extend from the lower left-hand and upper left-hand corners respectively. The conductor 7 and the tube 12 of the next annular member 2 in the upstream direction extend from the upper right-hand corner of the member, similarly to the arrangement shown in FIGURE 4. This arrangement of the conductors 7 is compact; it aids the packing of the portions 7' of the conductors 7 in the troughs 4 and 5, and it distributes the portions 7' substantially equally between the troughs 4 and 5.

When the hot gas from the combustion chamber 1 is passed through the duct, the magnetic field produced by the magnet 6 will induce in the gas electric currents which flows through the electrodes 2' of the annular members 2. Currents will flow in the connecting portions 2" of the annular members to the conductors 7 and the external load. The currents flowing through the electrodes 2' will not induce any electro-magnetic forces therein as the electrodes do not intersect lines of magnetic force. The currents flowing through the connectors 2" however will produce electro-magnetic forces perpendicular thereto and to the lines of magnetic force. In FIGURE 5, a force $P_1$ has been indicated to represent the sum of all the electro-magnetic forces acting on the connectors 2" positioned between two vertical transverse planes AA and BB through the duct and indicated by chain lines. The force $P_1$ can be resolved as indicated into longitudinal and transverse components $P_{1L}$ and $P_{1T}$ respectively. The currents flowing through the portions of the conductors 7', which are parallel with the longitudinal axis of the duct, produce electro-magnetic forces mutually perpendicular to said portions 7' and to the longitudinal axis. The force $P_2$ shown in FIGURE 5 represents the sum of all the electro-magnetic forces acting on the conductor portions 7' between the vertical planes AA and BB. The generator is preferably so designed that the current flows in the gas transversely of the axis of the duct in directions perpendicular to the longitudinal axis thereof and to the electrodes and so the electro-magnetic forces produced in the gas have no transverse components. When the generator is operated under "off-load" conditions or has been designed for such operation, the current will flow in the gas obliquely to the longitudinal axis of the duct and there will be a transverse component transmitted to the duct by the action of gas pressure on the side walls thereof. A force $P_3$ has been indicated to represent the sum of all the transverse components parallel to the planes AA and BB of the forces acting on the gas between those planes. The force $P_3$ where it exists under "off-load" conditions may act either in the direction shown or in the opposite direction. Since the electrical connections to and from the annular members are made at one end of the duct (i.e., in this example, the upstream end), the sum of the currents flowing in the downstream direction between the planes AA and BB must be equal to the sum of the currents flowing between those planes in the upstream direction of the duct. Also, the axial lengths of the conductors 7' and the projected axial lengths of the connectors 2" and the current flow path through the gas between the planes AA and BB are all equal. Therefore the transverse resultant of the electro-magnetic forces or components thereof in a direction perpendicular to the longitudinal axis of the duct and to the electrodes 2' and acting on the connectors 2", the conductor portions 7' and the gas flowing between the planes AA and BB is substantially zero. The planes AA and BB have been chosen arbitrarily and therefore the aforesaid transverse resultant is substantially zero in all planes perpendicular to the longitudinal axis of the duct throughout the whole length thereof. This is correct for all angles of inclination of the annular members.

The portions of the conductors 7 between the annular members and the conductor portions 7' extend mainly transversely of the duct and so the forces acting thereon are longitudinal and not transverse. Furthermore, these portions of the conductors 7 are tied to the collars 3 by the brackets 13.

By manufacturing the assembly of annular members the conductors 7, the troughs 4 and 5 and the collars 3 as one integrated structure, in which forces transverse to the longitudinal axis of the duct are substantially eliminated, no structure externally of the duct for withstanding transverse forces has to be provided.

There are resultant longitudinal forces acting on the assembly which must be counteracted by external structure; but this is not relevant to the present invention.

By taking the conductors 7 of axially successive annular members 2 from each corner thereof in cyclic order and by arranging substantially half the conductor portions 7' in each of the troughs 4 and 5, torque about the longitudinal axis of the duct due to the electro-magnetic forces will be substantially eliminated.

Instead of the conductor portions 7' being embedded in elastomeric masses in the troughs 4 and 5, they may be otherwise mechanically anchored to the appropriate outer walls of the duct. For example, clamps embracing the conductor portions 7' and secured to the collars 3 may be employed.

What I claim as my invention and desire to secure by Letters Patent of the United States is:

1. A generating duct for a magnetohydrodynamic (MHD) generator constructed from a plurality of annular members assembled end-to-end and annular layers of insulation interposed one between each pair of adjacent members, each annular member comprising a pair of electrodes defining opposite sides of the annular member and positioned substantially parallel with lines of force of a magnetic field, which in operation of the generator extends substantially perpendicularly to the longitudinal axis of the duct, and a pair of connectors defining the remaining sides of the annular member and each interconnecting adjacent ends of the electrodes, the duct also comprising a plurality of conductors electrically connected to the connectors of at least some of the annular members and leading to an electrical load externally of the duct, wherein the improvement comprises the conductors extending towards one end only of the duct and mechanically supported by the duct and arranged thereon that the resultant of the electro-magnetic forces perpendicular to the longitudinal axis of the duct and to the electrodes and acting on said connectors, said conductors and gas flowing through said duct is substantially zero.

2. A generating duct as claimed in claim 1 in which said conductors extend along substantially their whole length in directions substantially parallel to the longitudinal axis of the duct.

3. A generating duct as calimed in claim 2 of rectangular cross-section and in which substantially half said conductors are supported by one wall of the duct and the remainder are supported by the opposite wall of the duct.

4. A generating duct as claimed in claim 3 in which the walls of the duct supporting said conductors carry longitudinal troughs in which said conductors are located and to which they are secured.

5. A generating duct as claimed in claim 4 in which said conductors are embedded in each said trough in a mass of elastomeric material.

6. A generating duct as claimed in claim 5 in which said conductors extend along the troughs towards the upstream end of the duct.

7. A generating duct as claimed in claim 1 in which said conductors, said connectors and said electrodes are tubes through which during operation of the generator a coolant fluid is passed.

8. A generating duct as claimed in claim 1 in which the duct is divergent.

References Cited

UNITED STATES PATENTS

| | | | |
|---|---|---|---|
| 3,374,368 | 3/1968 | Swift-Hook et al. | 310—11 |
| 3,387,150 | 6/1968 | Powers et al. | 310—11 |

DAVID X. SLINEY, Primary Examiner